United States Patent [19]

Drehmel et al.

[11] Patent Number: 5,117,384
[45] Date of Patent: May 26, 1992

[54] METHOD AND APPARATUS FOR EXPONENT ADDER

[75] Inventors: Robert A. Drehmel, Goodhue; Scott A. Hilker, Rochester, both of Minn.

[73] Assignee: International Business Machines Corporation, Armonk, N.Y.

[21] Appl. No.: 702,341

[22] Filed: Apr. 3, 1991

Related U.S. Application Data

[63] Continuation of Ser. No. 469,628, Jan. 24, 1990, abandoned.

[51] Int. Cl.$^5$ .............................................. G06F 7/38
[52] U.S. Cl. ............................................... 364/748
[58] Field of Search ............ 364/748, 715.08, 715.01

[56] References Cited

U.S. PATENT DOCUMENTS

| | | | |
|---|---|---|---|
| 4,639,887 | 1/1987 | Farmwald | 364/748 |
| 4,644,490 | 2/1987 | Kobayashi | 364/748 |
| 4,807,172 | 2/1989 | Nukiyama | 364/715.08 |
| 4,849,921 | 7/1989 | Yasumoto et al. | 364/715.01 |
| 4,852,039 | 7/1989 | Maheshwari | 364/748 |
| 4,858,165 | 8/1989 | Gronowski et al. | 364/748 |
| 4,999,800 | 3/1991 | Birger | 364/748 |
| 4,999,803 | 3/1991 | Turrini et al. | 364/748 |

OTHER PUBLICATIONS

Earle et al., Exponent Differences and Preshifter, IBM Technical Disclosure Bulletin, vol. 9, No. 7, Dec. 1966, pp. 848–849.

Primary Examiner—Tan V. Mai
Attorney, Agent, or Firm—Richard E. Billion

[57] ABSTRACT

An apparatus and method for determining the difference between two exponents of two floating point numbers is disclosed. The exponent of each number is split into two portions. A high portion contains the most significant bits and a low portion contains the least significant bits. The number of bits in the low portion is related to the number of bits in the fraction portion of each floating point number. To determine differences that require a shift in one of the exponenets, one of the differences between the low portions of the exponents is selected based upon which of several conditions are found with respect to the difference between the high portion. Advantageously, a set of adders which are as wide as the number of bits in the low portion of each exponent are used.

10 Claims, 4 Drawing Sheets

METHOD AND APPARATUS FOR EXPONENT ADDER

CROSS REFERENCE TO RELATED APPLICATION

This application is a continuation of applicant's prior co-pending application Ser. No. 469,628, filed Jan. 24, 1990, now abandoned.

BACKGROUND OF THE INVENTION

The present invention relates to a method and apparatus for performing floating point arithmetic operations in a data processing system. More particularly, the invention relates to an apparatus, and method for implementing the apparatus, for performing the subtraction of exponents which is required by the arithmetic operations of addition and subtraction for floating point numbers. Subtraction of the smaller exponent from the larger exponent is used to determine the number of places the binary point must be shifted left in the fraction portion of a smaller floating point number before adding the fractions of two floating point numbers.

The use of floating point arithmetic operations in a data processing system has been a common practice practically since the inception of computer technology. The development of floating point arithmetic hardware has taken many forms, usually with the objectives of simplifying the hardware construction, or enhancing the speed of the arithmetic processing operation. The four arithmetic operations of add, subtract, multiply and divide have usually been accomplished by using specialized subsets of processes involving addition and subtraction. For example, multiplication operations have in many cases been performed by repeated addition processes, and division has been accomplished by a process of repeated subtraction. The efforts made to speed up these processing operations have focused on enhancements and simplifications of hardware circuit design, particularly the adder circuit, which ultimately limits the maximum processing speed of all arithmetic operations. In the case of division, efforts have been made to increase the speed of operation by calculating partial quotients, or by simultaneously predicting multiple quotient bits, to reduce the number of addition or subtraction iterations required for the divide calculation.

An American national standard has been developed in order to provide a uniform system of rules for governing the implementation of floating point arithmetic systems. This standard is identified as ANSI/IEEE Standard No. 754-1985, and is incorporated by reference herein. In the design of floating point arithmetic systems and algorithms, it is a principal objective to achieve results which are consistent with this standard, to enable users of such systems and algorithms to achieve conformity in the calculations and solutions to problems even though the problems are solved using different computer systems. The standard specifies basic and extended floating point number formats, arithmetic operations, conversions between integer and floating point formats, conversions between different floating point formats, conversions between basic format floating point numbers and decimal strings, and the handling of certain floating point exceptions.

Most commonly, floating point arithmetic operations are accomplished in either single precision or double precision format as defined by the IEEE Standard. Both of these formats utilize a sign, exponent and fraction field, where the respective fields occupy predefined portions of the floating point number. In the case of a 32-bit single precision number the sign field is a single bit occupying the most significant bit position: the exponent field is an 8-bit quantity occupying the next-most significant bit positions; the fraction field occupies the least significant 23-bit positions. In the case of a double precision floating point number the sign field is a single bit occupying the most significant bit position; the exponent field is an 11-bit field occupying the next-most significant bit positions: the fraction field is a 52-bit field occupying the least significant bit positions. Other formats for the exponent field and the fraction field are available and many may be developed based on the need of the application.

In the past, the difference between two exponents was found using adders which had the same width as called for by the particular floating point format. For example, finding the difference between the exponents of two floating point numbers in double precision format required adders of eleven bits wide. These adders typically are on the critical path meaning that the time spent subtracting one exponent from another directly impacts the overall speed of the entire arithmetic operation being performed. As a result, time saved in finding the difference between exponents speeds up the entire arithmetic operation.

One of the operations that slows down an adder is when a carry propagates across each bit. The time necessary for the carries to propagate across a wide adder is longer than the time necessary for the carries to propagate across a short adder. One way to increase the speed of determining the difference between two exponents would be by using an adder which is less than the number of bits wide designated by the particular floating point format.

It is a principal object of the present invention to provide an apparatus and method capable of use with any desired format for floating point arithmetic.

It is a further object of the present invention to provide an apparatus and method for achieving certain floating point arithmetic operations in a shorter time period than previously obtained, through the reduction in the amount of time required to provide these operations.

It is a further object of the present invention to provide an apparatus and method for adding and subtracting two numbers in floating point. More specifically, it is an object of the present invention to provide an apparatus and method for subtracting the exponential field of one number from the exponential field of another number to determine the shift of the binary point in one of the numbers to allow addition or subtraction of the numbers while achieving a desirable reduction in processing time.

SUMMARY OF THE INVENTION

The invention includes an apparatus and a method for determining the differences between two exponents in an exponent adder of a device for processing floating point addition and subtraction operations. When adding two numbers in floating point, the exponential portions of the two numbers must be equal before the fraction portions of the two numbers can be added. By this invention, each exponent is split into a high portion and a low portion. The low portion is selected so that the highest number that can be represented is greater than or equal to the number bits devoted to the fraction portion in the format selected. The difference in the exponents between two numbers is found by finding the difference between the low portions and the difference between the high portions of the exponents in parallel. The difference between the low portions of the exponents gives the proper difference between the entire exponents when the difference between the high exponents has certain results. When other results are obtained from determining the difference between the high portions of the exponent, the addition of the smaller number to the larger number yields the larger number since the shift required to align the two fractions would be so large that the fractions of the two numbers would no longer overlap. When certain results are obtained as the difference between the high portions of the exponents, then these results are used to select the proper difference between the low portions of the exponents.

BRIEF DESCRIPTION OF THE DRAWINGS

For a better understanding of the present invention, reference may be had to the accompanying drawings in which.

These drawings are not intended as a definition of the invention but are provided solely for the purpose of illustrating the preferred embodiment of the invention described below.

DESCRIPTION OF THE PREFERRED EMBODIMENT

Figure 1:
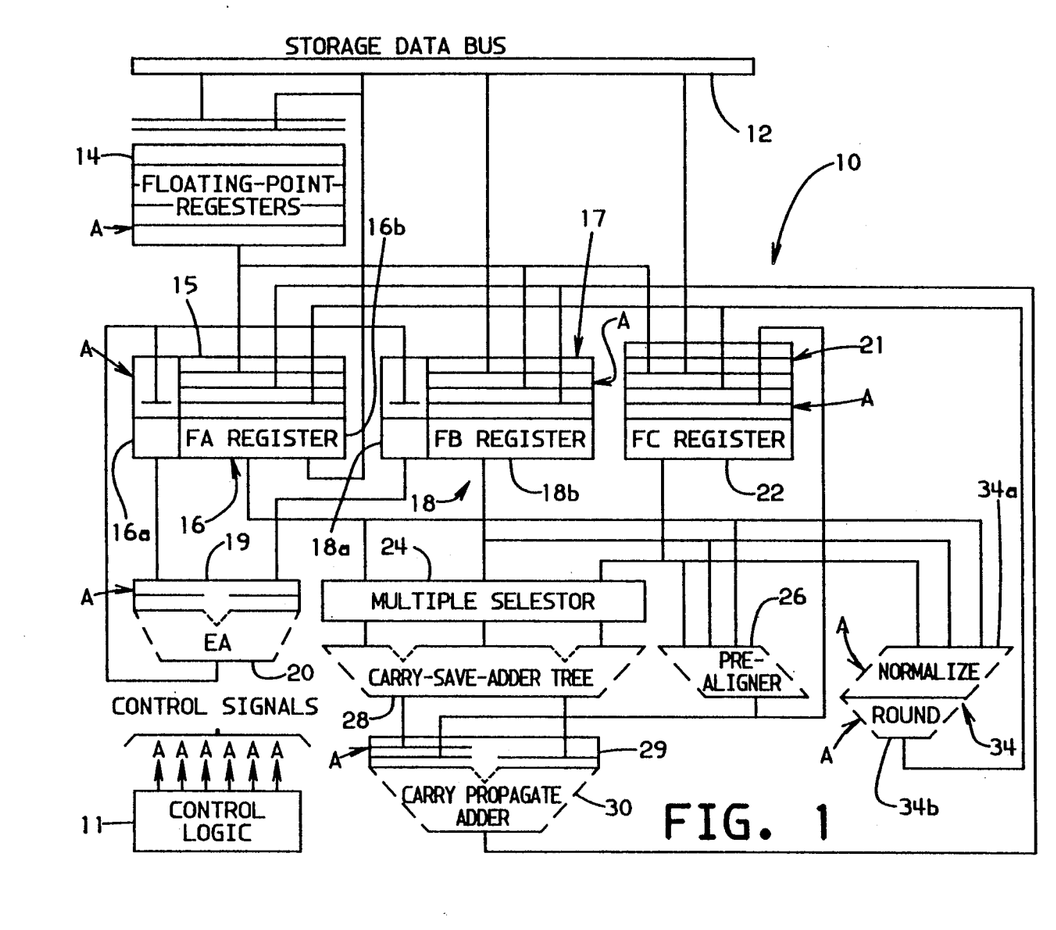
FIG. 1 shows a block diagram of a floating point arithmetic circuit used with the present invention.

Referring first to FIG. 1, there is shown an example of a block diagram of a floating point arithmetic circuit 10 which may be used in conjunction with the present invention. The execution of floating point arithmetic utilizes such a circuit because of the specific algorithms which must be performed to determine the proper results. This circuit presumes that the floating point numbers have been prearranged according to a particular format, where the most significant bit represents the sign of the floating point number, and wherein a group of the next-most significant bits represent the exponent of the floating point number, and wherein the remaining bits represent the fraction value of the number; i.e., the fraction value presuming that the binary point is placed at the left-most end of the fraction value. In the case of floating point arithmetic utilizing single precision calculations wherein the size of the number is 32-bits, the sign bit is presumed to be bit 0, the exponent bits are 1-8, and the fraction value bits are 9-31. In the case where the floating point arithmetic is accomplished utilizing double precision numbers, the sign bit is bit 0, the exponent bits are 1-11, and the fractional value bits are 12-63. In addition to the foregoing identified bits, the hardware registers and logic associated with FIG. 1 include four additional bits; the I bit occupies the most significant position in the fraction field, and the G, R and S bits respectively occupy the least significant bit positions in the fraction field.

Floating point operands cannot be added to or subtracted from each other unless their exponents are equal. This requires that their exponents be compared, and the operand fraction with the smaller exponent be shifted right the amount of the exponent difference. The fractions can then be added or subtracted with the larger exponent as the result exponent. Multiplication of floating point operands requires that the exponents be added and the fractions multiplied. Division of floating point operands requires that the divisor exponent be subtracted from the dividend exponent and the dividend fraction be divided by the divisor fraction.

The floating point arithmetic circuit of FIG. 1 can support both single and double precision arithmetic operations. It is designed to support a floating point add or subtract operation. It should be noted that Applicant's invention will work with circuits which implement other floating point formats.

The floating point arithmetic circuit 10 of FIG. 1 utilizes a storage data bus 12 for receiving and transmitting data from other sources, such as a data processing system or the like. Information received over data storage bus 12 may be transmitted into a plurality of floating point registers 14. Floating point registers 14 may transmit information to an FA register 16, an FB register 18, or an FC register 22. FA register 16 may also transmit information back to floating point registers 14.

The FA register 16 is a destination register for data from the floating point registers 14, and is the source register for data being transmitted to the floating point registers 14. The FA register 16 is also the source register for data which may be transferred to a memory via storage data bus 12, and it is a destination register for data transmitted from a carry-propagate adder 30, an exponent adder 20, and from a normalize-round circuit 34. The FA register 16 has outputs to a multiple selector 24, a prealigner circuit 26, a normalize-round circuit 34, and the exponent adder 20. The FA register 16 contains the second operand for add, subtract, compare, multiply and divide operations. FA register 16 has a section 16a for holding the exponent of the floating point number, and a section 16b for holding the fraction portion of the floating point number.

In order to selectively control which of the plurality of inputs to the FA register 16 are to be gated into the register, the FA register 16 has an input multiplexer circuit 15 associated therewith. Multiplexer circuit 15 provides for the selective gating of the various inputs into register 16, under control of an activation signal A. Other registers in the floating point arithmetic circuit 10 have similar multiplexer input controls.

A control logic circuit 11 generates all of the activation signals required for data interchange and processing operations within floating point arithmetic circuit 10. Control logic circuit 11 has a plurality of control signal outputs, designated A, each of which serve as control inputs to various circuits and registers. It is well within the skill of the art to understand the need and design for a control logic circuit 11, as well as the activation signals A which are required for the operation of floating point arithmetic circuit 10; accordingly, a detailed presentation of these circuits and signals is not provided herein.

The FB register 18 is a destination register for data received from the storage data bus 12, the floating point registers 14, and is also a destination register for data from the carry-propagate adder 30, and from the normalize-round circuit 34. It has outputs to the multiple selector 24, the prealigner circuit 26, and the exponent adder 20. The FB register is used to contain the first operand for the add, subtract, compare and divide operations; it also contains the intermediate result of the add, subtract and multiply operations. The FB register 18 has a section 18a for containing the exponent value of the floating point number, and a section 18b for containing the fraction portion of the floating point number, and has an input multiplexer circuit 17 for gating data into the register under control of activation signals from control logic circuit 11.

The FC register 22 is a destination register for data from memory via storage data bus 12, and a destination register for data from the carry-propagate adder 30 and from the normalize-round circuit 34. It is also the destination register from the floating point registers 14. The FC register 22 has outputs to the multiple selector 24, the prealigner circuit 26, and the normalize-round circuit 34. The FC register 22 is used to contain the first operand of the multiply operation, and it is the destination register for the result of a divide operation. An input multiplexer circuit 21 controls the gating of data into FC register 22, under control of activation signals from control logic circuit 11.

The prealigner circuit 26 is used to pre-shift the fraction with the smaller exponent for the add and subtract operation, which is necessary to make the floating point operand exponents equal prior to an add or subtract operation. The prealigner circuit 26 has the capability to shift a floating point fraction right from 0 to as many positions necessary as required by the selected format for the floating point. If double precision arithmetic is being performed, the prealigner is capable of shifting from 0–55 bit positions. The prealigner circuit 26 has an output to the carry-propagate adder 30, and to the FC register 22.

The multiple selector 24 is a logic circuit which generates multiples of the multiplicand for the multiply operation, and multiples of the divisor for the divide operation. For the divide operation, the multiples are decoded from the high-order bits of the dividend or partial dividend, and of the divisor. The complement of the operand may be generated by the multiple selector when necessary. The multiple selector 24 receives data from the FA register 16, the FB register 18, and the FC register 22. The multiple selector 24 has outputs to the carry-save adder tree 28.

The carry-save adder tree 28 will permit three operands to be added together at the same time. This permits the use of a divide algorithm which generates two quotient bits per iteration. The carry-save adder tree 28 receives data from the multiple selector 24, and transmits data to the carry-propagate adder 30.

The carry-propagate adder 30 is a 57-bit adder, and has an input from the carry-save adder 28 for generating the partial product of a multiply operation or the partial dividend of a divide operation. The carry-propagate adder circuit 30 may also receive inputs from the prealigner circuit 26, the FA register 16, and the FB register 18. The carry-propagate adder has an output connection to the FA register 16 and the FB register 18. An input multiplexer circuit 29 controls the gating of data into carry-propagate adder 30, under control of activation signals A from control logic circuit 11.

The normalize-round circuit 34 includes a normalize circuit 34a which is used to normalize the results of a floating point operation. For example, the result of a multiply operation may require a left-shift of 1-bit in order to normalize the fraction, and the result of an add or subtract operation may require left-shift of up to 54-bit positions. The normalize-round circuit 34 also includes a round circuit 34b, which contains an incrementor circuit, for use in certain rounding operations, where the result may have to be incremented by a value of 1 in the low-order bit position.

Figure 2:
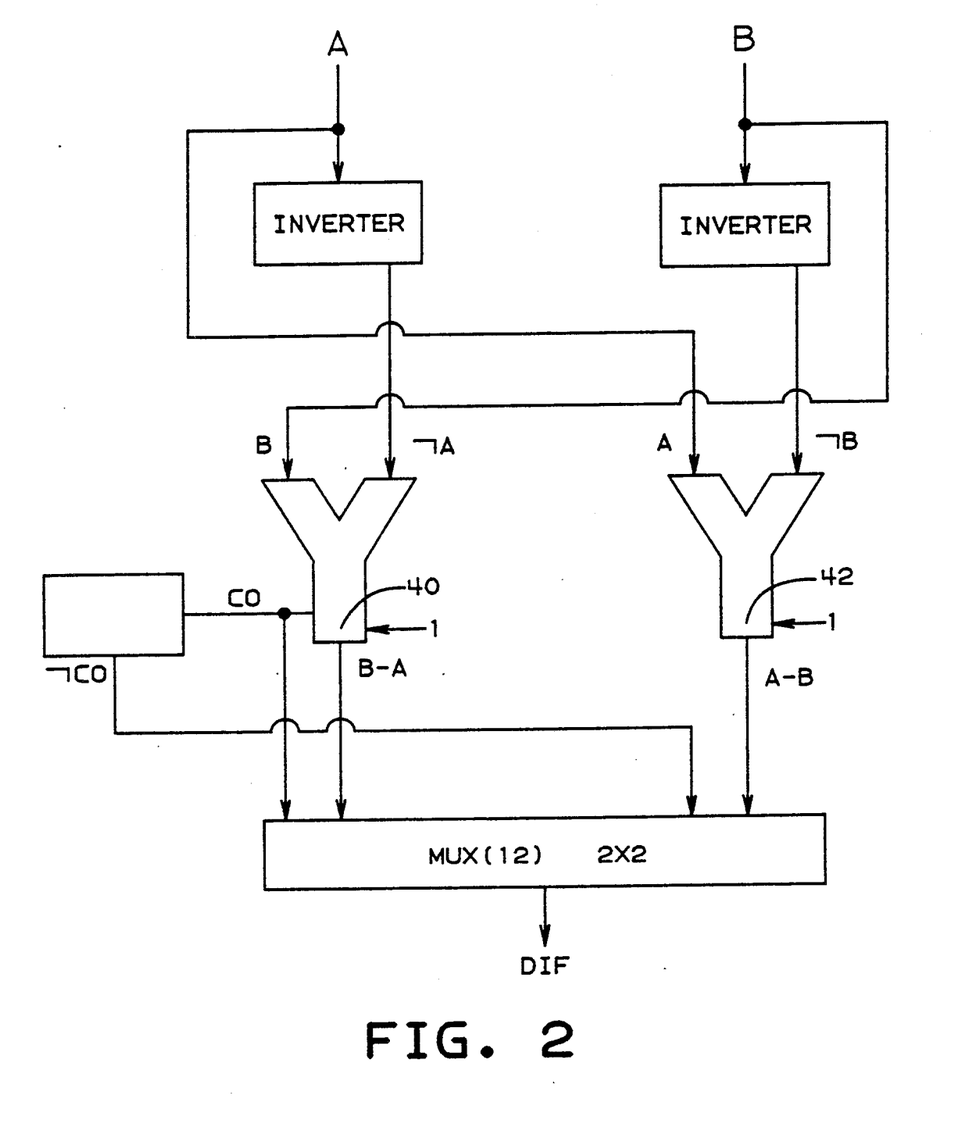
FIG. 2 is a diagram showing the apparatus used to determine the difference between two exponents according to the prior art.

FIG. 2 shows, very basically, the apparatus used in prior art exponent adders or subtractors 20. Prior art exponent subtractors generally consisted of two adders 40 and 42. Each of the adders, 40 and 42, had a bit width equal to the exponent bit width designated by the particular format used to represent the floating point numbers. For example, in double precision floating point, an 11 bit adder is used since in that format 11 bits are devoted to the exponent portion of the number. There are other formats that devote additional bits to the exponent portion of the floating point number where larger adders would be needed to accommodate the subtraction of exponents.

Basically, the first exponent and the 2's complement of the second exponent are added in adder 40 while the second exponent and the 2's complement of the first exponent are added in adder 42. By adding the 2's complement of one of the exponents to the other exponent, this effectively yields the difference between the two exponents. These two operations are done in parallel. The sign or carries of each difference are then checked so that the difference which represented the smaller exponent subtracted from the larger exponent can be selected. Once this difference is determined, the fraction of the number having the smaller exponent is shifted to the right by the number of places determined by the difference between the exponents.

The propagation of carries in an exponent subtractor slows down the entire process of determining the difference between the exponents, which in turn slows down the arithmetic process in floating point addition or subtraction. As mentioned previously, there are floating point formats which devote more bits to the exponent than the double precision format which devotes eleven bits to the exponent. The greater the number of bits devoted to the exponent portion in a particular format, the larger the delay due to carries since a wider adder must be used to determine the difference between the exponents, and carries propagate across more bits.

Now referring to FIG. 3, an apparatus 50 for determining the difference between two exponents which is the subject of this invention will be described. The exponents are designated as exponent A and Exponent B. Exponent A is cleaved into two portions, a high portion designated by box 52, and a low portion, designated by box 54. The low portion 54 represents a certain number of lesser significant bits. The high portion 52 represents a certain number of the more significant bits. Elsewhere in FIG. 3 these portions are also designated as AH which represents the bits associated with the high portion 52 of Exponent A and AL which represents the bits associated with the low portion 54 of Exponent A. Similarly, Exponent B is cleaved into two portions, a high portion 56 and a low portion 58. These portions are also designated BH and BL in other areas of FIG. 3. BH represents the bits associated with the high portion of Exponent B, and BL represents the bits associated with the low portion of Exponent B.

The apparatus 50 for determining the difference between two exponents also includes an adder 60 and an adder 62. In these adders, the differences (AL−BL) and (BL−AL) are determined. Also from one of the adders a carry out signal 64 is output. In FIG. 3, the carry signal 64 is shown as output from adder 60. It should be noted that the carry signal could be output from adder 62 and the apparatus 50 would be equally effective in determining the difference between the exponents.

Also included in apparatus 50 is a compare circuit 66. The compare circuit 66 is used to determine one of three states, namely if AH=BH, or if AH+1=BH, or if BH+1=AH. The compare circuit 66 can be realized by either using a circuit with one adder, a circuit with two adders, or a circuit with two incrementors. Referring to FIG. 4 the latter type of compare circuit 66 is shown and includes an incrementor 92 and an incrementor 94. The compare circuit 66 also includes three comparators 96, 98, and 100. The signals representing AH and BH are input to comparator 96 to determine if they are equal. If they are not equal comparator 96 does not produce an output. The signal AH is also input to incrementor 92 which adds one to the bit stream represented by AH. This signal (AH+1) is input to comparator 98 along with the signal BH. If AH+1=BH then comparator 98 produces an output. Finally, the signal BH is input into incrementor 94 which produces a bit stream equal to (BH+1). This signal, BH+1 is then input to comparator 100 along with AH. If AH=BH+1 then comparator 100 will produce an output. In most instances an output will be produced from the compare circuit 66 indicating AH=BH, AH=BH+1 or BH=AH+1.

Now returning to FIG. 3, the apparatus also includes a select high circuit 67. In the event that there is no output from compare circuit 66, the select high circuit 67 determines whether BH>AH or AH>BH. The circuit also selects the higher number A or B. Such a circuit can be implemented in a number of ways. An example of one way of implementing select high circuit 67 could be by having the output of compare circuit 66, namely AH=BH, BH=AH+1 and AH=BH+1 input into a three way NOR gate. When the three way NOR produces an output, then the select high circuit 67 would select A if it was greater than B, or B if it was greater than A. Two selectors, each having the three way NOR as an input, and one having an input when AH>BH and one having an input when BH>AH would be used to select the higher of A or B. An adder 69 can be used to determine if AH or BH is higher. The carry from the difference of either AH−BH or BH−AH AH will determine which floating point number is higher.

The apparatus 50 also includes several selectors 68, 70 and 72, and a mux 74. Inputs to selector 68 include the carry signal 64 from adder 60 which determines (AL−BL), and two inputs from the compare circuit 66 namely (AH=BH) and (AH=BH+1) Inputs to selector 70 include the carry signal 64 from adder 60 which determines (AL−BL), and two inputs from the compare circuit 66 namely (AH=BH) and (AH+1=BH). Selector 72 selects the fraction portion which will be shifted. Inputs to selector 72 include (AH=BH+1). (AH=BH) and the carry signal 64. The mux 74 selects the proper difference between the exponents A and B. Inputs to the mux 74 include the output from selector 68 and the output from selector 70 as well as the output from adder 60 and the output from adder 62. From these various inputs the mux 74 selects the amount of difference between the exponents so the proper right shift of the fraction portion of the smaller floating point number occurs.

The invention is based on the premise that if the fraction portion of the smaller floating point number has to be shifted right more places than the width of the fraction portion of the floating point number in order to add the numbers, the effect of adding the smaller floating point number will be the same as adding a zero. In other words, if the difference in the exponents indicates that a shift of more spaces than the number of bits devoted to the fraction portion of the floating point number is required, then the smaller number need not be added to the larger number. The effect of adding the smaller to the larger number would be very small.

From this premise it follows that it is only necessary to determine the exponent differences that would cause shifts within the range of the number of bits devoted to the fraction portion of the floating point number. Differences in exponents that would cause larger shifts in the fraction portion of one of the floating point numbers need only be detected. If such a large difference between the exponents is present, then the floating point number which is larger is selected as the sum of the two numbers using the select high circuit 67 since adding the smaller floating point number would not change any of the bits in the fraction portion of the larger floating point number when the smaller number is added to the larger number.

Basically, in this invention the floating point exponent portion of each of the numbers being added or subtracted is divided into a high portion and a low portion. The low portion is selected so that the highest number that could be represented would be equal to or more than the number of bits devoted to the fraction portion of the floating point number of the format the particular numbers are in. For example, in the double precision format for floating point numbers 53 bits are devoted to the fraction portion of the number. The low portion is set at six bits since the highest possible number represented by six bits is 63 which is greater than 53. If only five bits were used then the highest possible number represented would only be 31 which would be inadequate since 31 is less than 53. The number of bits required to be in the lower portion of each exponent portion equals the LOG 2 [(# of bits devoted to the fraction)]. Of course, the number of bits in the lower portion has to be an integer number so this number is always rounded up to the next highest integer. The number of bits devoted to the high portion of each exponent is equal to the [(number of exponent bits)−−(number of bits for the lower portion)].

In the invention, it is only necessary to determine the difference between the low portion of the exponent A and the low portion of exponent B and to determine if three conditions occur with respect to the high portion of exponent A and the high portion of exponent B. From this information, all the differences requiring a shift in the fraction portion of the smaller floating point number where the smaller fraction will still overlap with the larger fraction can be determined. Advantageously a smaller or narrower adder is used in Applicant's invention rather than the adders generally used in the prior art. In the prior art the bit width of the adder generally corresponded to the number of bits devoted to the exponent. Applicant's invention is quicker since a lesser number of carries will occur in the smaller or narrower adder. Carries propagating through an adder slow down the process of addition and the exponent subtraction is along the critical path in performing floating point addition and subtraction.

Depending on the combination received, the differences which require a shift in the fraction can be determined. The difference between the high portions of the two exponents must be either 0 or 1. Any other difference would indicate a shift of greater than the number of places devoted to the fraction portion of the floating point number. In that case, the larger floating point number A or B is selected as the answer of A+B. Select high circuit 67 is used to select the higher floating point number.

An example will make this more clear. Assume that the double precision format is used. The six least significant bits of the exponent portion are designated as the bits in the lower portion. The higher portion of the exponent would include the five most significant bits of the exponent portion of each of the floating point numbers. If the difference between the higher portions of two floating point numbers is 1, that would correspond to a difference of 64. The largest difference between the exponents would then be equal to [127, (64+63)] and the smallest difference would be 1 (64−63) since the largest difference in the lower portion can be at most 63. If the difference in the higher portion is 2 that would correspond to a difference of 128. Now the smallest difference would be 128−63 which equals 65. A bit shift of 65 is more than the fractional portion of the floating point number in double precision format (53 bits are the maximum) and, therefore, adding the smaller floating point number to the larger would yield the same result as adding zero to the larger floating point number. Thus, it can be seen that the only conditions of interest are if AH=BH, if BH=AH+1, or if AH=BH+1. If any other conditions occurred with respect to the high portions of the exponents of A and B, then addition of the smaller number would have no effect on the outcome of the higher number. When any other conditions occur between AH and BH, select circuit 67 is used to select the higher floating point number.

The differences (AL−BL) and the (BL−AL) are found using two adders having a bit width equal to the number of bits designated for the lower portion of the exponents in the floating point system. For example using the double precision floating point format, a six bit adder is used since the lower portion of the exponent includes the six least significant bits. The difference which is selected depends on which of the three conditions exist with respect to the high portions of each exponent and on the relationship between the lower portions of each of the exponents. The selection process is summarized in the following table:

If AH=BH and AL≧BL then DIF=AL−BL

If AH=BH and BL>AL then DIF=BL−AL

If AH=BH+1 and BL>AL then DIF=AL−BL

If BH=AH+1 and AL≧BL then DIF=BL−AL

These are the only conditions which yield a shift within the number of bits devoted to the fraction portion of the floating point numbers. Any other conditions result in shifts larger than the number of bits devoted to the fraction portion of the floating point number. For example if BH is greater than AH by 1 which corresponds to a difference of 64 and if BL is larger than AL then a shift of greater than 64 is required which is beyond the maximum shift of 53.

When AH=BH the selection of the correct difference (DIF) is straightforward. AL−BL if AL≧BL, or BL−AL if BL<AL. When the difference between AH and BH is 1, DIF is found as follows. If AH=BH+1 and BL>AL, then this is the same as subtracting BL−AL, with the lower portion being N bits wide, from $2^{}N$. So, DIF=$2^{}N$−(BL−AL)=AL−BL. Similarly if BH=AH+1 and AL≧BL, then the same argument yields DIF=$2^{**}N$−(AL−BL)=BL −AL.

Figure 3:
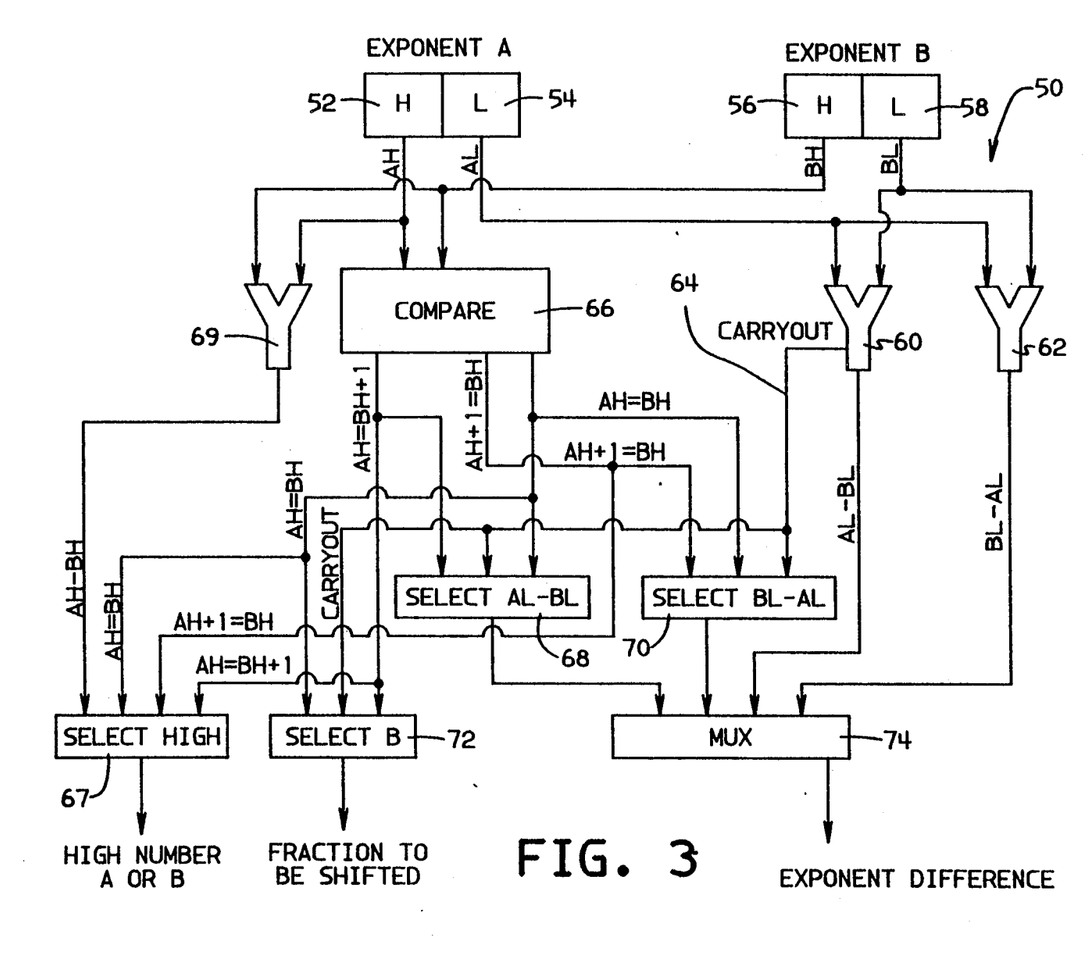
FIG. 3 is a diagram showing the apparatus for determining the difference between two exponents according to the invention.
Figure 4:
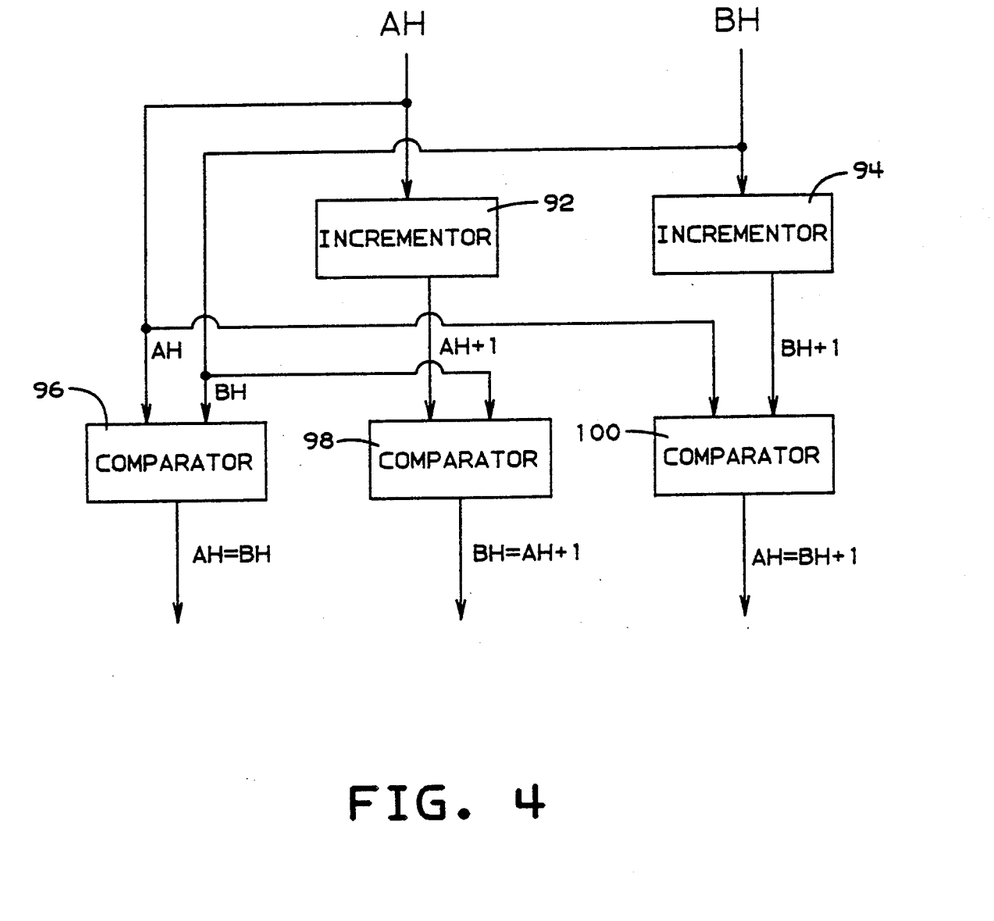
FIG. 4 is a diagram showing one embodiment of the compare circuit which is part of the apparatus shown in FIG. 3.

In operation, the hardware shown in FIG. 3 and FIG. 4 implements the conditions stated in the above table. The compare circuit shown in FIG. 4 compares AH to BH. (AH+1) to BH, and (BH+1) to AH. One signal indicating one of the conditions in the above table, namely AH=BH. BH=AH+1, or AH=BH+1, is output from the compare circuit 66. It should be noted that if there is no output from the compare circuit 66 then one of the numbers, A or B, is so much larger than the other number that adding the smaller number after shifting the binary point would have no effect on the larger number. In this event, select high circuit 67, selects the higher floating point number as the answer to the addition or subtraction operation.

Selectors 68, 70 and 72 and MUX 74 are realized using 2×2 AND-OR gates. It should be noted that the functions of these selectors and the MUX could also be realized using other combinations and sizes of AND-OR gates. Selector 68, selects AL−BL when AH=BH and the carry from adder 60 is equal to 1, which indicates that AL≧BL. Selector 68 will also select AL−BL when AH=BH+1 and when the carry from adder 60 is equal to 0, which indicates that BL>AL. Selector 70 selects BL−AL when AH=BH and when the carry from adder 60 is equal to 0. which indicates that BL>AL. Selector 70 also selects BL−AL when BH=AH+1 and when the carry from adder 60 is equal to 1, which indicates that AL ≧BL.

MUX 74 acts to gate the proper difference, either (AL−BL) or (BL−AL), determined by either the adder 60 or the adder 62 in response to a signal from either selector 68 or selector 70. The output of adders 60 and 62 are both input to the MUX 74. MUX 74 will select the quantity AL−BL in the presence of a signal from the selector 68 and will select the quantity BL−AL in the presence of a signal from the selector 70. The output of MUX 74 indicates the proper exponent difference which indicates the proper number of positions to shift the binary point in a floating point number. It should be noted that if there is no output from MUX 74 then the larger floating point number is the proper sum. No output indicates that the exponent difference is a number larger than the number of bits devoted to the fraction portion of the floating point numbers and that the shift would be larger than the number of bits in the fraction portion of the floating point number.

Selector 72 selects the fraction portion of floating point number A or B, which will be shifted right. The fraction portion of the smaller number is selected. When AH=BH and the carry signal 64 is equal to 0, then the fraction portion from floating point number A is selected. When BH=AH+1 and the carry signal 64 is equal to 1, then A is also selected. Otherwise, B is selected.

As can be seen the invention speeds up the process of determining the difference between two exponents which is necessary in order to add or subtract two floating point numbers. It is well known that carries propagating across the bits in an adder is the major factor in slowing down an adder. It is also known that a narrower adder is quicker than a wider adder since the carry will not propagate across as many bits. The invention splits the exponent portion of each of the floating point numbers into two sections and uses narrower adders to determine the difference. This limits the number of carries that propagate across an adder which in turn cuts down the time consumed in the operation of determining the difference between two exponents when compared to prior methods and apparatus which use adders of the same width as the exponent to determine the difference between two exponents.

The present invention and the best mode for practicing it has been described. It is to be understood that the foregoing description is illustrative only and that other means and techniques can be employed without departing from the full scope of the invention described in the appended claims.

What is claimed is:

1. A circuit in a floating point arithmetic circuit for producing shift controls to align the fraction portion of two floating point numbers, said circuit comprising:

a first register for holding an exponent portion of a first number A, said first register further including a selected number of cells which hold a selected number of less significant bits of the exponent, designated AL, and a selected number of cells for holding the remaining more significant bits of the exponent portion of the number, designated AH;

a second register for holding an exponent portion of a second number B, said second register further including a selected number of cells which hold a selected number of less significant bits of the exponent, designated BL, and a selected number of cells for holding the remaining more significant bits of the exponent portion of the number, designated BH;

a first adder circuit for subtracting a selected number of the cells which hold the less significant bits of the exponent portion of the first floating point number in the first register, designated AL, and a selected number of cells which hold the less significant bits of the second floating point number in the second register, designated BL, said first adder circuit outputting a signal AL−BL;

a second adder circuit for subtracting a selected number of the cells which hold the less significant bits of the exponent portion of the second floating point number in the second register, designated BL, and a selected number of cells which hold the less significant bits of the first floating point number in the first register, designated AL, said second adder circuit outputting a signal BL−AL;

a comparator circuit coupled to said first register and said second register, further comprising:

a first incrementor circuit for incrementing the cells in the first register which hold the more significant bits of the first exponent, designated AH, by one and outputting a signal, designated AH +1;

a second incrementor circuit for incrementing the cells in the second register which hold the more significant bits of the second exponent, designated BH, by one and outputting a signal, designated BH +1;

a first comparator outputting a signal when AH=BH;

a second comparator coupled to the first register and the second incrementor and outputting a signal when AH=BH+1;

a third comparator coupled to the second register and the first incrementor and outputting a signal when BH=AH+1; and a multiplexer coupled to said first adder circuit, said second adder circuit and said said comparator circuit, said multiplexer receiving AL−BL, and BL−AL, and the output of the comparator circuits as inputs and outputting AL−BL or BL−AL as a shift control signal for aligning the fraction portion of one of the two floating point numbers in response to an output from the comparator circuit.

2. An apparatus for producing shift controls for aligning the fraction portion of two floating point numbers in a floating point arithmetic circuit, each of said floating point numbers in a selected floating point format having a selected number of bits devoted to the fraction portion and having a selected number of bits devoted to the exponent portion, said apparatus comprising:

a first register for holding an exponent portion of a first number A, said first register further including a selected number of cells which hold a selected number of less significant bits of the exponent, designated AL, and a selected number of cells for holding the remaining more significant bits of the exponent portion of the number, designated AH;

a second register for holding an exponent portion of a second number B, said second register further including a selected number of cells which hold a selected number of less significant bits of the exponent, designated BL, and a selected number of cells for holding the remaining more significant bits of the exponent portion of the number, designated BH;

a first adder circuit;

a second adder circuit, each of said first and second adder circuits having AL and BL as inputs, one of said first or second adder circuits outputting AL−BL, the other of said first and second adder circuits outputting BL−AL;

a third adder circuit having AH and BH as inputs and outputting AH−BH; and a multiplexer coupled to said first adder circuit, said second adder circuit and said third adder circuit, said multiplexer receiving AH−BH, AL−BL, and BL−AL as inputs and outputting AL−BL or BL−AL as a shift control signal for aligning the fraction portion of one of the two floating point numbers in response to the signal AH−BH equaling the value 1,0 or −1.

3. A shift control circuit of a floating-point arithmetic system wherein a floating-point arithmetic routine is executed for two numbers in floating point format, said numbers having an exponent portion and a fraction portion, said shift control circuit comprising:

a first register having cells which hold the bits devoted to the exponent portion of a first number, designated A;

a second register having cells which hold the bits devoted to the exponent portion of a second number, designated B;

adder circuit means to which a selected number cells from the first register representing the lesser significant bits of the exponent of the first number, designated AL, and to which a selected number cells from the second register representing the lesser significant bits of the exponent of the second number, designated BL, are input, said adder circuit means outputting the difference between the selected cells of the first number and the selected cells of the second number, designated AL−BL, and outputting the difference between the selected cells of the second number and the selected cells of the first number, designated BL−AL;

incrementor circuit means to which the remaining number of cells from the first register representing the more significant bits of the exponent of the first number, designated AH, and the remaining number of cells from the second register representing the more significant bits of the exponent of the second number, designated BH, is input, said incrementor circuit means outputting the more significant bits of the first register incremented by one, designated AH+1, and the more significant bits of the second register incremented by one, designated BH+1;

comparator circuit means having as inputs the remaining number of cells from the first register representing the more significant portion of the exponent, designated AH, and remaining number of cells from the second register representing the more significant portion of the exponent, designated BH, and the outputs from said incrementor circuit means, said comparator circuit means outputting a signal when AH=BH, when AH=BH+1, and when BH+AH+1; and multiplexer circuit means for selecting an output from said adder circuit means as the shift control signal in response to an output from the comparator circuit means.

4. The shift control circuit of claim 3 wherein the number of cells in the first register which hold the less significant bits and the number of cells in the second register which hold the less significant bits is equal to the next higher integer greater than or equal to: LOG 2.

5. The shift control circuit of claim 3 wherein the multiplexer circuit means selects the output from the first adder, designated AL−BL, as the shift control signal when AH=BH and when AL greater than or equal to BL.

6. The shift control circuit of claim 3 wherein the multiplexer circuit means selects the output from the second adder, designated BL−AL, as the shift control signal when AH=BH and when BL greater than AL.

7. The shift control circuit of claim 3 wherein the multiplexer circuit means selects the output from the first adder, designated AL−BL, as the shift control signal when AH=BH+1 and when BL greater than AL.

8. The shift control circuit of claim 3 wherein the multiplexer circuit means selects the output from the second adder, designated BL−AL, as the shift control signal when BH=AH+1 and when AL greater than BL.

9. The shift control circuit of claim 3 further comprising a select high circuit for selecting the larger of the two numbers in floating point format, said select high circuit further comprising:

an adder coupled to the first register and the second register, said adder having the cells representing the more significant bits of the exponent of the first register, designated AH, and the cells representing the more significant bits of the exponent of the second register, designated BH as inputs, said adder outputting the difference AH−BH; and a selector circuit coupled to said adder and said comparator circuit means, said selector circuit having AH−BH, AH=BH+1, BH=AH+1, and AH=BH as inputs, said selector circuit selecting the larger of the two floating point numbers as the sum of the two floating numbers in response to the input from the adder, AH−BH, and in the absence of inputs from said comparator circuit means.

10. A method for producing a shift control signal from shift control circuit of a floating-point arithmetic system having a first register with cells holding the bits of the exponent of the first number and having a second register with cells holding the bits of the exponent of the second number and having a first adder circuit and a second adder circuit, and having an incrementor circuit, and having a comparator circuit and a multiplexer circuit, said method comprising the steps of:

extracting a selected number of cells from the first register, representing the lesser significant portion of the exponent held in the first register, designated AL, and inputting the cells to each of the first and second adder circuits;

extracting a selected number of cells from the second register, representing the lesser significant portion of the exponent held in the second register, designated BL, and inputting the cells to each of the first and second adder circuits, said first adder circuit outputting AL−BL and said second adder circuit outputting BL−AL;

extracting the remaining number of cells from the first register, representing the more significant bits of the exponent held in the first register, designated AH, and inputting that to the incrementor circuit, said incrementor circuit incrementing AH by one and outputting AH+1;

extracting the remaining number of cells from the second register, representing the more significant bits of the exponent held in the second register, designated BH, and inputting that to the incrementor circuit, said incrementor circuit incrementing BH by one and outputting BH+1;

extracting the remaining number of cells from the first register and the second register, representing the more significant bits of the exponent held in the first register, designated AH, and the more significant bits of the exponent held in the second register, designated BH, and inputting them to the comparator circuit;

extracting the more significant cells of the first register, AH, and the more significant cells of the second register, BH and inputting them to the comparator circuit along with the output of the incrementor circuit, said comparator circuit producing outputs when AH =BH+1, when BH=AH+1, and when AH=BH; and inputting the output of the comparator circuit and the output of the first adder and the second adder to the multiplexer, said multiplexer selecting the output of the first or second adder as the amount to shift control in the presence of an output from the comparator circuit.

* * * * *